(12) United States Patent
Jafa et al.

(10) Patent No.: US 11,804,095 B2
(45) Date of Patent: Oct. 31, 2023

(54) INTERACTIVE VENDING MACHINE

(71) Applicant: PepsiCo, Inc., Purchase, NY (US)

(72) Inventors: Emad Jafa, Brewster, NY (US); Xuejun Li, White Plains, NY (US); Yong Serock, Newtown, CT (US); Cheuk Chi Lau, White Plains, NY (US); Martyn Thomas Mitchell, Royston (GB); Euan Morrison, Cambridge (GB); Wai Ting Chan, Cambridge (GB); Samuel Luke Johnstone, Cambridge (GB); Erik David Williams, Cambridge (GB)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/662,520

(22) Filed: May 9, 2022

(65) Prior Publication Data
US 2022/0270430 A1 Aug. 25, 2022

Related U.S. Application Data

(62) Division of application No. 16/179,327, filed on Nov. 2, 2018, now Pat. No. 11,354,965.

(51) Int. Cl.
*G07F 9/02* (2006.01)
*G07F 11/62* (2006.01)
(Continued)

(52) U.S. Cl.
CPC .......... *G07F 9/023* (2013.01); *G06Q 30/0631* (2013.01); *G07F 9/006* (2013.01); *G07F 9/0235* (2020.05); *G07F 11/62* (2013.01)

(58) Field of Classification Search
CPC .......... G07F 9/023; G07F 11/62; G07F 15/76; G07F 9/006; G07F 9/0235; A61B 5/1117;
(Continued)

(56) References Cited

U.S. PATENT DOCUMENTS 2,924,035 A 10/1956 Linker
5,996,838 A * 12/1999 Bayer ................ G07F 11/42
221/241
(Continued)

FOREIGN PATENT DOCUMENTS

EP 1783705 A2 * 5/2007 .............. G07F 11/36
JP 10334321 A 12/1998
(Continued)

OTHER PUBLICATIONS

International Search Report and Written Opinion issued in International Application No. PCT/US19/57627, dated Jan. 9, 2020, 14 pages.

*Primary Examiner* — Rakesh Kumar
(74) *Attorney, Agent, or Firm* — Sterne, Kessler, Goldstein & Fox P.L.L.C.

(57) ABSTRACT

A vending machine has an interactive customer experience. Some embodiments of the vending machine include a transparent front wall with a plurality of display units located behind the front wall. Each of the display units may contain an example of a product available for vending. Based on input received from a customer and other information, the vending machine may provide a recommendation for a product or products to select for purchase. The vending machine may highlight the recommendation by selectively illuminating the product display units that contain the recommended products.

21 Claims, 7 Drawing Sheets

(51) Int. Cl.
  *G07F 9/00* (2006.01)
  *G06Q 30/0601* (2023.01)
(58) Field of Classification Search
  CPC ..... A61B 5/0022; A61B 5/024; A61B 5/7264; A61B 2562/0219
  USPC .............................................. 221/8; 700/237
  See application file for complete search history.

(56) References Cited

U.S. PATENT DOCUMENTS

| | | | | |
|---|---|---|---|---|
| 7,444,204 | B2 * | 10/2008 | Chirnomas | ............... G07F 9/02 |
| | | | | 700/244 |
| 7,451,892 | B2 | 11/2008 | Walker et al. | |
| 8,082,061 | B2 | 12/2011 | Segal et al. | |
| 8,335,586 | B2 | 12/2012 | Ochi | |
| 8,417,376 | B1 | 4/2013 | Smolen | |
| 8,527,089 | B2 * | 9/2013 | Meacock | ............... G07F 9/0235 |
| | | | | 700/242 |
| 8,683,745 | B2 * | 4/2014 | Artwohl | ............. G09F 23/0058 |
| | | | | 49/70 |
| 8,820,575 | B2 * | 9/2014 | Nicholson | ............... G07F 9/002 |
| | | | | 700/231 |
| 9,229,557 | B2 | 1/2016 | Segal et al. | |
| 9,646,451 | B2 * | 5/2017 | Blust | ........................ G07F 7/00 |
| 9,710,992 | B2 * | 7/2017 | Borra | ...................... G07F 11/00 |
| 10,258,170 | B2 * | 4/2019 | Dunn | ................... G09G 3/3406 |
| 10,380,359 | B2 * | 8/2019 | Naqvi | .................... H04W 12/02 |
| 10,380,546 | B2 * | 8/2019 | Chau | ................. G06Q 10/0875 |
| 10,467,844 | B2 * | 11/2019 | Diaz | ................... G07F 11/004 |
| 2005/0156027 | A1 * | 7/2005 | Munari | ..................... G07F 9/02 |
| | | | | 235/381 |
| 2006/0229953 | A1 | 10/2006 | Walker et al. | |
| 2006/0241965 | A1 | 10/2006 | Walker et al. | |
| 2007/0239519 | A1 * | 10/2007 | Walker | .................... G07F 9/02 |
| | | | | 705/7.29 |
| 2009/0143904 | A1 * | 6/2009 | Blust | ....................... G07F 17/16 |
| | | | | 705/1.1 |
| 2010/0138037 | A1 * | 6/2010 | Adelberg | ................ G07F 9/001 |
| | | | | 700/241 |
| 2010/0237091 | A1 * | 9/2010 | Garson | ................... G07F 11/16 |
| | | | | 221/226 |
| 2010/0275267 | A1 | 10/2010 | Walker et al. | |
| 2010/0332027 | A1 * | 12/2010 | Ochi | ......................... G07F 9/02 |
| | | | | 700/232 |
| 2011/0022980 | A1 | 1/2011 | Segal et al. | |
| 2012/0221143 | A1 | 8/2012 | Ochi | |
| 2012/0285089 | A1 | 11/2012 | Artwohl et al. | |
| 2013/0005443 | A1 | 1/2013 | Kosta et al. | |
| 2013/0265525 | A1 | 10/2013 | Dunn et al. | |
| 2013/0310970 | A1 | 11/2013 | Segal et al. | |
| 2015/0073590 | A1 | 3/2015 | Crambo et al. | |
| 2015/0144653 | A1 * | 5/2015 | Kline | ...................... G07F 9/001 |
| | | | | 222/23 |
| 2015/0278844 | A1 | 10/2015 | Lee | |
| 2015/0371313 | A1 | 12/2015 | Xia et al. | |
| 2017/0337421 | A1 * | 11/2017 | Yamasaki | ............ B67D 1/0888 |
| 2018/0040053 | A1 | 2/2018 | Robinson et al. | |
| 2018/0285959 | A1 * | 10/2018 | Peyer | ................. G06Q 30/0633 |
| 2018/0349979 | A1 | 12/2018 | Robinson et al. | |
| 2019/0057569 | A1 | 2/2019 | Signorelli et al. | |
| 2019/0122125 | A1 * | 4/2019 | Dragicevic | ............ G16H 20/00 |
| 2019/0156611 | A1 * | 5/2019 | Redhead | ................. G07F 9/006 |
| 2019/0304237 | A1 | 10/2019 | Appelhans | |
| 2019/0385117 | A1 * | 12/2019 | Lowe | ................. G06Q 30/0645 |
| 2019/0385730 | A1 * | 12/2019 | Baugh | .................... G16H 20/90 |
| 2020/0042930 | A1 * | 2/2020 | Cappitelli | ............. G06Q 10/20 |
| 2020/0058060 | A1 * | 2/2020 | Yamamoto | ........... G06Q 20/209 |
| 2020/0074090 | A1 | 3/2020 | Naqvi et al. | |
| 2020/0143620 | A1 * | 5/2020 | Jafa | ......................... G07F 11/62 |
| 2020/0211085 | A1 * | 7/2020 | Robinson | ........... G06Q 30/0203 |
| 2020/0226660 | A1 * | 7/2020 | Wunderle | ............... G06V 10/82 |

FOREIGN PATENT DOCUMENTS

| | | | | |
|---|---|---|---|---|
| JP | 10334321 | A * | 12/1998 | ............. G09F 23/00 |
| JP | 2002074486 | A * | 3/2002 | ............. G09F 23/00 |
| JP | 2007074486 | A | 3/2007 | |
| JP | 2008015808 | A | 1/2008 | |
| JP | 2008015808 | A * | 1/2008 | ............. G09F 23/00 |
| JP | 2010152689 | A | 7/2010 | |
| JP | 2010152689 | A * | 7/2010 | ............. G09F 23/00 |
| JP | 2011181060 | A | 9/2011 | |
| JP | 2011181060 | A * | 9/2011 | ............. G09F 23/00 |
| WO | WO-0103087 | A1 * | 1/2001 | ............. G06Q 20/20 |
| WO | WO-2016011372 | A2 * | 1/2016 | ........... B67D 1/0027 |
| WO | WO-2020181066 | A1 * | 9/2020 | ......... G06K 9/00624 |

\* cited by examiner

INTERACTIVE VENDING MACHINE

FIELD

The described embodiments generally relate to vending machines and systems and methods for dispensing food and beverage products from a vending machine.

BACKGROUND

Vending machines are used to dispense food and beverage products to consumers in an automated fashion. A typical vending machine can contain a combination of beverages, such as soda, juice, or water, and food products, such as nuts, snack mix, and candy bars. Vending machines typically include advertising or branding on exterior surfaces that is designed to attract potential customers.

BRIEF SUMMARY

A product dispenser includes a housing with a display section located in a front portion of the housing. The display section includes a plurality of display units configured to contain a product such that the product is visible from the exterior of the housing. A product storage section is located in a rear portion of the housing. The product storage section is configured to releasably store a plurality of the products. A plurality of display products is located in each of the display units. A delivery portal is located on the front of the housing such that the delivery portal is horizontally centered on a front wall of the housing. A user interface is located on the exterior of the front portion of the housing and a controller is configured to receive input from the user interface and based on that input provide product recommendations. A product delivery system is located in the product storage section and is configured to deliver a product from the product storage section to the delivery portal. None of the products disposed in the display units are able to be delivered to the delivery portal.

Some embodiments of the disclosure include a vending machine with an interactive product display that includes a housing including a transparent portion. A display unit is located inside the housing, wherein the display unit is configured to hold a product and wherein the display unit is visible from the exterior of the housing. A display light is located inside the housing and is configured to illuminate the display unit. A product storage system is located in the housing, wherein the product storage system is configured to releasably store a plurality of products. A delivery portal is located on the housing. A user interface is also located on the housing and a product delivery system is located in the housing and is configured to deliver one of the plurality of products from the product storage section to the delivery portal. A controller is operatively linked to the display light and is configured to illuminate the display light in response to a query received by the user interface.

A method of assisted product dispensing with a vending machine includes detecting a customer in proximity to the vending machine, transmitting an inquiry to the customer in response to the detection of the customer, and receiving a first product preference from the customer. The vending machine illuminates one or more product display units disposed behind a transparent front wall of the vending machine, wherein the one or more product display units each contain a product that matches the first product preference. Any product display units that contain products that do not match the first product preference are not illuminated. The method includes receiving a product selection from the customer and dispensing the selected product from a dispensing portal that is located on the transparent front wall, wherein the dispensing portal is horizontally centered on the front wall.

BRIEF DESCRIPTION OF THE FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Figure 1:
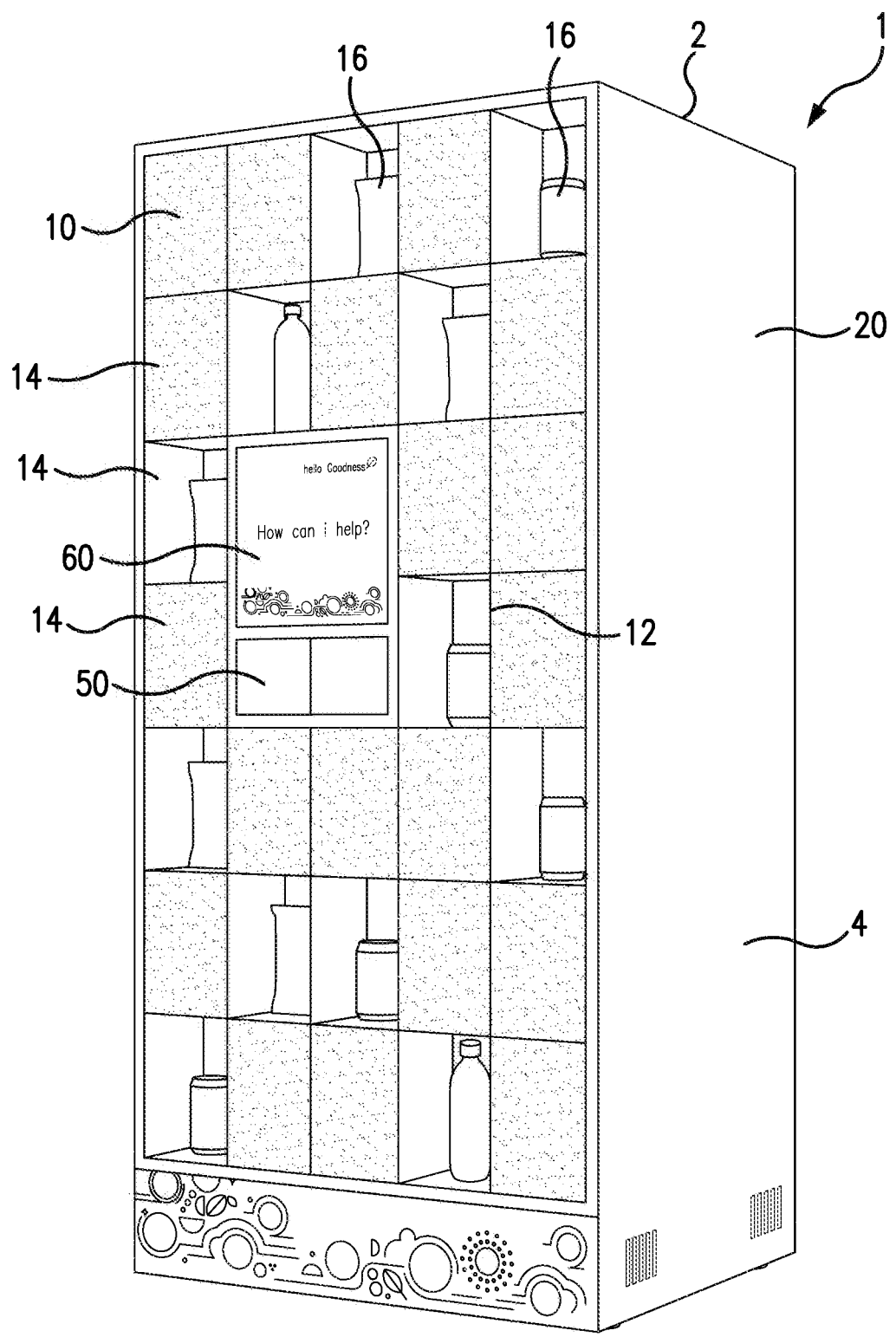
FIG. 1 is a perspective view of a vending machine according to embodiments.
Figure 2:
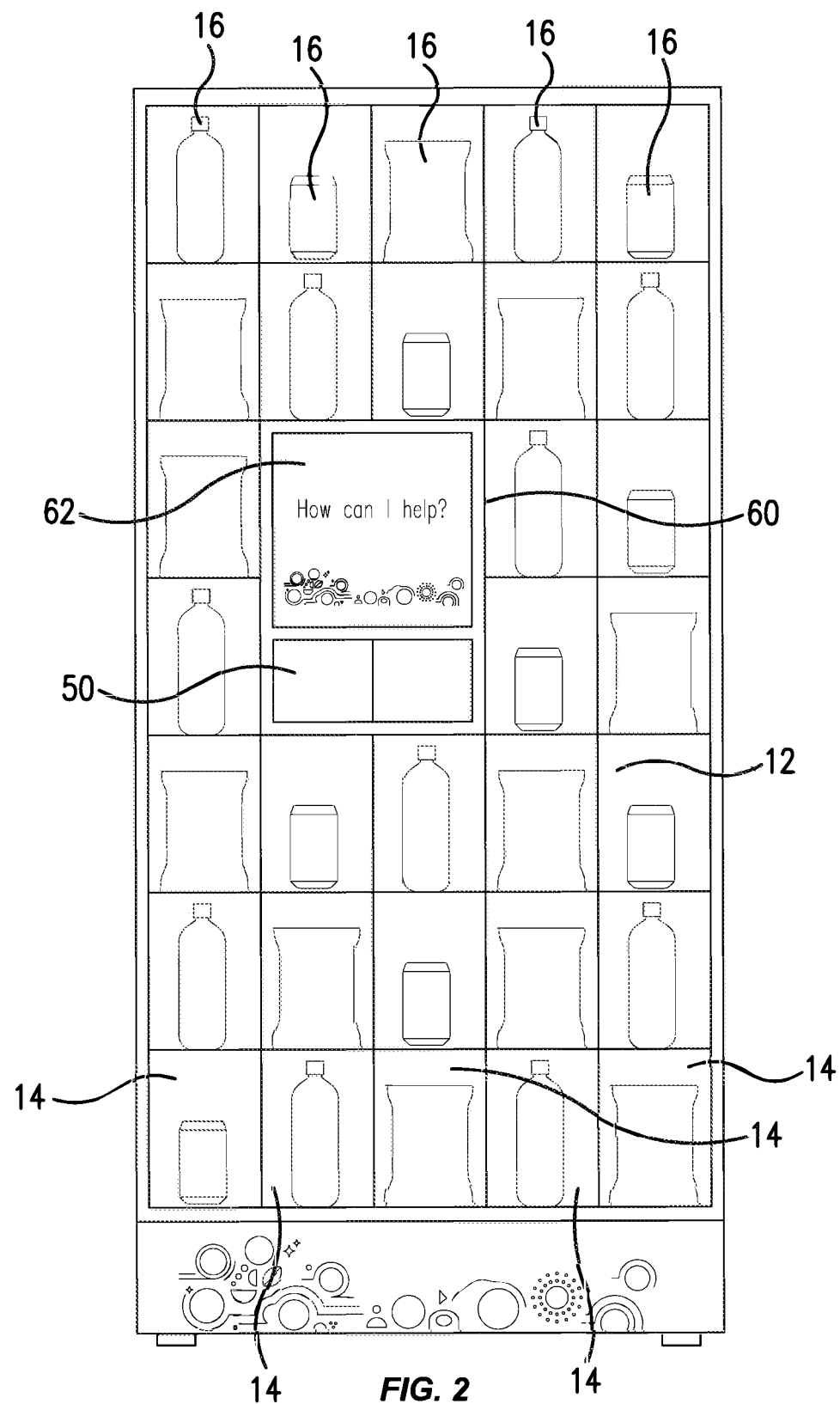
FIG. 2 is a front view of a vending machine according to embodiments embodiments.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Vending machines are devices designed to automatically dispense products, including consumable products, such as soda or candy bars, to a consumer without the need for a salesperson to be present. These machines are configured to securely store the food products and dispense a selected product once payment for the product has been processed. A typical vending machine has a large, rectangular housing that stores the food products and contains the necessary input and payment systems.

Interactions between vending machines and customers are limited. Typically, a customer approaches a vending machine, examines images or actual examples of products available for vending, and purchases one of the products. This limited interaction reduces the opportunities available to persuade a potential customer to purchase a product. Customers who are unsure of what they would like to purchase receive limited information to guide them to a given product and cannot receive information tailored to their specific needs.

Embodiments of the present disclosure include a vending machine that includes a housing with a display section located in a front portion of the housing. The display section includes a plurality of display units configured to contain a product such that the product is visible from the exterior of the housing. A product storage section is located in a rear portion of the housing. The product storage section is configured to releasably store a plurality of the products. A plurality of display products is located in each of the display units. A delivery portal is located on the front of the housing such that the delivery portal is horizontally centered on a front wall of the housing. A customer interface is located on the exterior of the front portion of the housing and a controller is configured to receive input from the customer interface and based on that input provide product recommendations. A product delivery system is located in the product storage section and is configured to deliver a product from the product storage section to the delivery portal. None of the products disposed in the display units are able to be delivered to the delivery portal. Advantages of this embodiment include an enhanced ability for a customer to interact with the vending machine. The vending machine may also provide guidance and recommendations to the customer as to which product to select for purchase.

Figure 3:
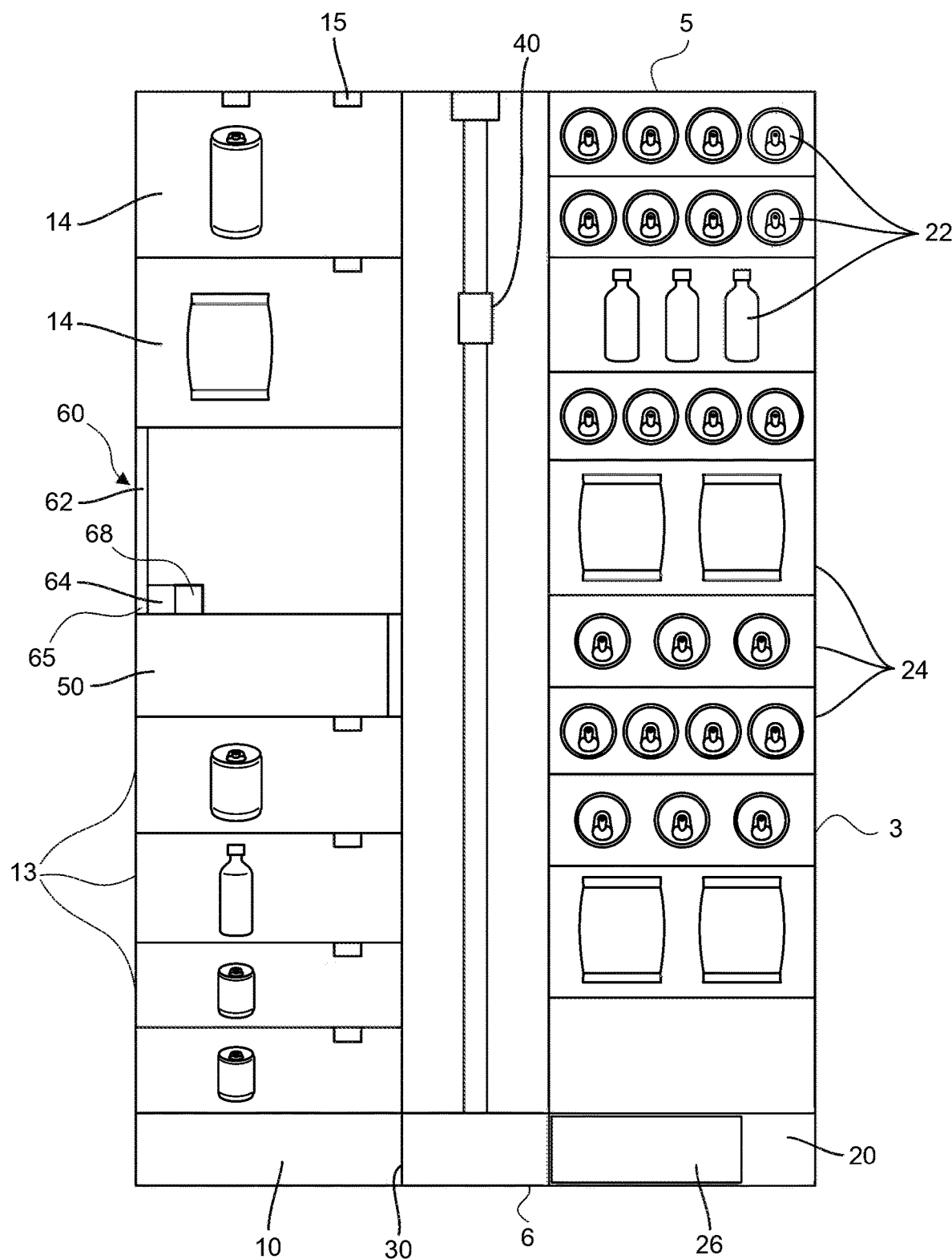
FIG. 3 is a cross section view of a vending machine according to embodiments.
Figure 4:
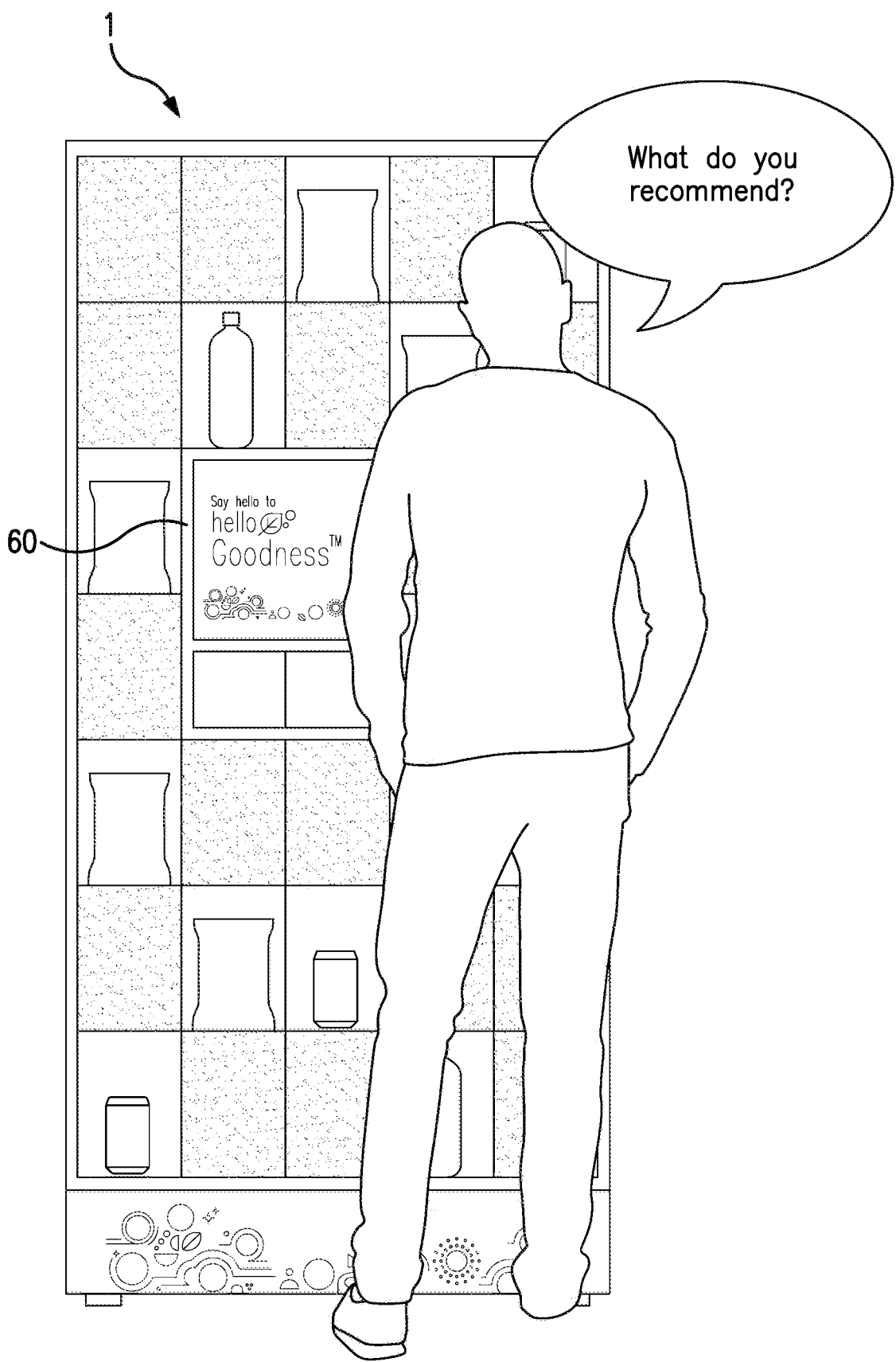
FIG. 4 is a view of an interaction between a customer according to an embodiment of a vending machine.

With reference to FIGS. 1 and 3, a vending machine 1 includes a housing 2 that is split into a display or front portion 10 and a rear portion 20. Front portion 10 and rear portion 20 are separated by a dividing wall 30 that spans the full height of housing 2. Dividing wall 30 is oriented such that it is approximately parallel with a front wall 12 of vending machine 1. Front portion 10 is located in front of rear portion 20 in housing 2. Housing 2 also includes a rear wall 3, side walls 4, a top wall 5, and a bottom wall 6. In one embodiment, housing 2 may have a rectangular shape. In other embodiments, other shapes including, but not limited to, circular, square, cylindrical, or other suitable shapes may be used. In one embodiment, housing 2 may be integral with or embedded into another structure, such as, for example, a wall.

Front portion 10 includes front wall 12. In embodiments, front wall 12 is at least partially transparent. Front wall 12 may be made from any appropriate material suitable for use in a vending machine front wall, such as glass or plastic. In some embodiments, front wall 12 may include a transparency control element 13 that can modify the transparency of front wall 12. Transparency control element 13 can be designed to make discrete portions of front wall 12 opaque on command. Transparency control element 13 may be an adhesive film that is attached to the inside surface of front wall 12. The film may be capable of varying its transparency based on an input from a controller.

In embodiments, housing 2 includes a plurality of display units 14 for displaying one or more products 16. A plurality of display units 14 are located immediately behind front wall 12 in front portion 10. Display units 14 are configured to hold display products 16 such that display products 16 are visible from the exterior of vending machine 1 through front wall 12. In some embodiments, display units 14 are rectangular in shape with walls made from an opaque material that extend inward from front wall 12. Display units 14 may be arranged in a grid pattern that fills substantially all of the area of front wall 12. Each of the plurality of display units 14 may include display lighting 15 that is configured to illuminate the interior of display unit 14. Display lighting 15 may be capable of varying the intensity and color of illumination present in display unit 14. In embodiments, display units 14 may display a representation of display products 16 instead of actual display products 16. Such representations may include, for example, an image displayed on a display screen located inside display units 14, a "dummy" product (e.g. a cardboard mock-up of display product 14), or a hologram of display product 16.

Display products 16 may be representative of the vending products 22 available for purchase. Display products 16 and vending products 22 may include perishable and non-perishable products. Display products 16 and vending products 22 may include, but are not limited to, chips, candy bars, soft drinks, water, carbonated water, juices, alcoholic beverages, sports drinks, pre-made packaged goods, fresh food items, or other suitable products. In some embodiments, display products 16 and vending products 22 may include convenience items, medicine, toiletries, electronic devices, or other suitable non-perishable products.

In embodiments, a delivery portal 50 is located on front wall 12. As shown, for example, in FIG. 3, delivery portal 50 extends through front portion 10 to dividing wall 30. Delivery portal 50 is configured to allow a customer to retrieve a vending product 22 that they have purchased without being able to access the remainder of the interior of vending machine 1. In some embodiments, delivery portal 50 is approximately horizontally and/or vertically centered on front wall 12. This positioning provides several advantages, including, for example, easier retrieval of vending product 22 by the customer.

Rear portion 20 is separated from front portion 10 by dividing wall 30. With reference to FIG. 3, rear portion 20 releasably stores vending products 22 that are available for vending. In some embodiments, vending products 22 may be stored in product storage cartridges 24 that are configured to releasably store vending products 22. Product storage cartridges 24 are designed to releasably store vending products 22 and are typically used to store one type of vending product 22 in each product storage cartridge 24. The use of product storage cartridges 24 to store vending products 22 allows for quicker restocking of vending products 22 because empty product storage cartridges 24 may be rapidly replaced with pre-filled product storage cartridges 24. In some embodiments, rear portion 20 may also include a refrigeration system 26. Refrigeration system 26 may be configured to maintain a desired temperature in both front portion 10 and rear portion 20.

In embodiments, a delivery system 40 is also disposed in rear portion 20. Delivery system 40 is designed to transfer vending products 22 from their storage location in rear portion 20 to the opening of delivery portal 50 which is located on dividing wall 30. Delivery system 40 may be any type of system for delivering products in a vending machine. For example, delivery system 40 may be a standard x-y vending system with a horizontal actuation system, a vertical actuation system, and a product transporter that can releasably retain a product. In another example, delivery system 40 may be include a horizontal conveyer belt system with a vertical actuation component, wherein vending products 22 are released onto the horizontal conveyor belt, which can be positioned at the correct height for the conveyor belt to transport vending products 22 to delivery portal 50.

In embodiments, vending machine 1 includes a user interface 60 for allowing customers to interact with vending machine 1 and to facilitate the selection of products 16 for vending. A user interface 60 is located on front wall 12. In some embodiments, user interface 60 is located adjacent to delivery portal 50. Embodiments of user interface 60 may receive input from a customer in several different ways. User interface 60 may include a touchscreen 62 that can receive input from customers and display information about the products available at vending machine 1. Touchscreen 62 may be configured to visually display information about vending products 22 and to allow customers to select and purchase a vending product 22. In other embodiments, user interface 60 may also include a separate keypad for receiving input from a customer in addition to touchscreen 62.

User interface 60 may also interact with customers using a voice interface 64. Voice interface 64 may include one or more microphones and one or more speakers mounted on an exterior surface of vending machine 1. In some embodiments, voice interface 64 may be integrated into touchscreen 62. Voice interface 64 can receive inquiries and product selections from a customer speaking aloud. In some embodiments, a customer may select and purchase a product solely using voice commands. Vending machine 1 may also be configured to audibly recite information to a customer through voice interface 64. The information recited may include currently available vending products 22, nutritional and other information about vending products 22, and sales information.

In some embodiments, user interface 60 may also include sensors 65 that enable a customer to interact with vending machine 1 using hand gestures. For example, a horizontal sweeping gesture may result in scrolling through or potential vending products 22 displayed on touchscreen 62. In some embodiments, a customer may provide input to vending machine 1 solely through physical movement or gestures. For example, a customer may use gestures or motions to scroll through various vending products 22 displayed on touchscreen 62 and may then use different gestures to select a desired vending product 22 for purchase. In another example, a customer may use gestures in combination with having vending machine 1 recite information about different vending products 22 through voice interface 64. It may not be necessary to display information about vending products 22 using this combination of elements. Embodiments of user interface 60 may include any or all of the features described above, and may be configured to use any or all of them in different combinations to interact with customers.

Embodiments of vending machine 1 may include a controller 68 operatively linked to a computer memory 67. In some embodiments, a set of product attributes 66 may be stored in computer memory 67. Product attributes 66 may be any number of attributes linked to each product. For example, product attributes 66 may be price, nutritional information, taste profile, quantity information, and the like. Other information may also be stored inside computer memory 67, including external information such as the current time and date, outside weather conditions, and any sales or promotions occurring with respect to vending products 22 available from vending machine 1.

In embodiments, a communications system 69 may be operatively connected to controller 68 and computer memory 67. Communication system 69 may connect to an external network 80, such as a cellular data network or WIFI network to download updated information from an external information source. In some embodiments, communication system 69 may be configured to transmit and receive information from a customer through a customer device 82 that is connected to external network 80. Thus, customer may provide input to user interface 60 through communication system 69 from customer device 82. For example, a customer may have a mobile application on customer device 82 that allows them to provide input to user interface 60 through communication system 69. Customer device 82 may include devices such as smart phones, computers, tablets, and the like.

Embodiments of vending machine 1 may interact with customers during selection and purchasing of a product. For example, a customer may view product attributes 66 for any number of vending products 22 and make their selection based on those product attributes 66. Vending products 22 may also be filtered by desired product attributes 66. For example, a customer may filter for vending products 22 that have less than a certain number of calories or are caffeine free. After such a selection, vending machine 1 may display the results on touchscreen 62, may recite the results audibly using voice interface 64, or may vary the intensity or color of illumination in product display units 14 that contain display products 16 that meet the selected product attributes 66. In some embodiments, the transparency of the portion of front wall 12 over non-matching display products 16 may be reduced using transparency control elements 13 to indicate non-matching options. In embodiments, transparency control elements 13 may be a film that is applied to transparent front wall 12. The film may be configured to change transparency based on an electrical signal received by the film.

Vending machine 1 may also interact with customers by making recommendations. For example, a customer may query vending machine 1 by asking for a general recommendation of a product to purchase. The customer may query vending machine 1 by using touchscreen 62, speaking through voice interface 64, or making motions/gestures that are received by sensors 65. Vending machine 1 may make a product recommendation based on any of product attributes 66 combined with instructions stored on computer memory 67. For example, vending machine 1 may make a recommendation based on any sales or promotions of vending products 22. In another example, vending machine 1 may make a recommendation based on a combination of product attributes 66 and external information, such as the time of day or weather conditions. For example, if it is early in the morning, vending machine 1 may recommend a drink with higher levels of caffeine that is appropriate for consumption in the morning. In a further example, if the outside temperature is elevated, vending machine 1 may recommend a cold beverage that is designed to quench thirst. Recommended products may be indicated by any of the means described above, including visual display on touchscreen 62, audible description through voice interface 64, and selective illumination of appropriate product display units 14.

In embodiments, vending machine 1 includes one or more sensors 65 for detecting the approach of a potential customer. Sensor 65 may include a motion detecting sensor, a camera, or other suitable sensor for detecting the presence of a nearby customer. In embodiments, sensor 65 may be positioned to view the space adjacent to the exterior of vending machine 1. Vending machine 1 may activate a pre-programmed sequence 70 of sounds and lighting effects when a potential customer is detected in proximity to vending machine 1. Sequence 70 is designed to entice customers into purchasing a product from vending machine 1. For example, sequence 70 can include the sound of a can of soda being opened, the sound of a glass being filled with a beverage, or images of various food and beverage products. In some embodiments, sequence 70 may include a scent component which is dispensed from a scent dispenser 63, which may be part of user interface 60, disposed inside vending machine 1. Possible scents may include the scent associated with different food and beverage products. In some embodiments, sequence 70 might include selective illumination of product display units 14 to showcase, for example, display products 16 that are on sale.

Figure 5:
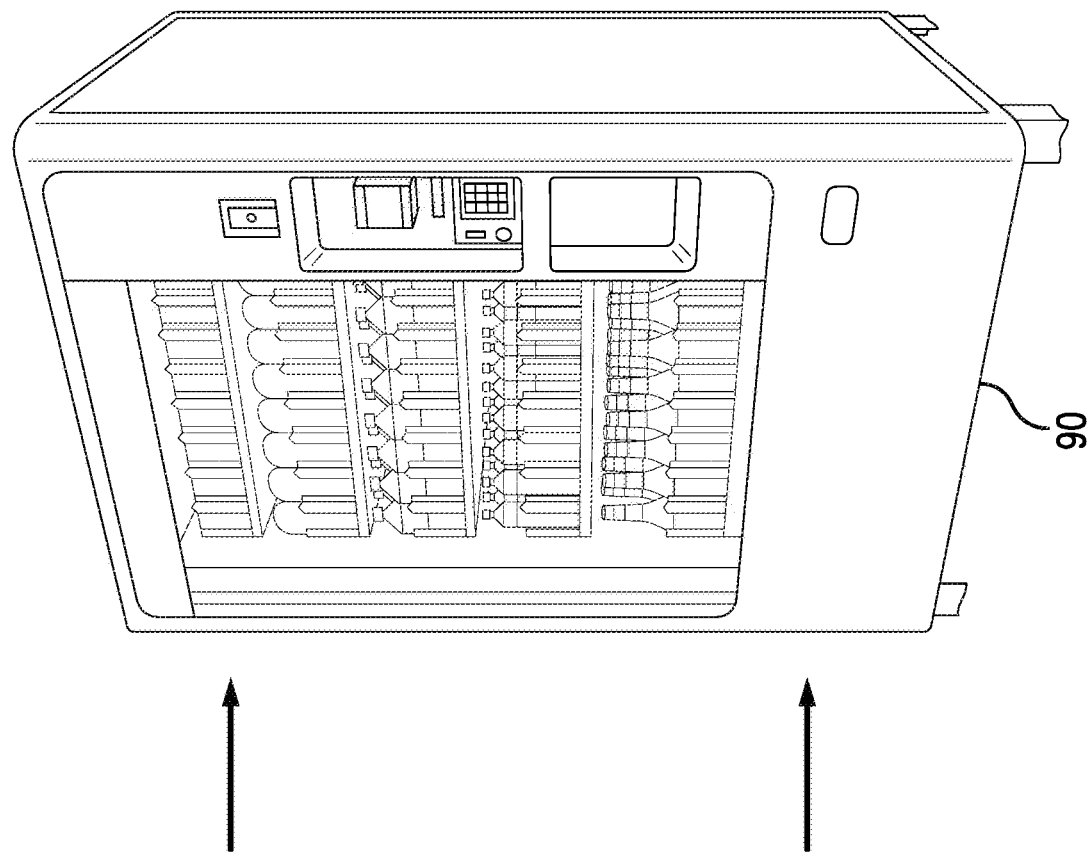
FIG. 5 is a perspective view of a retrofit embodiment of the present disclosure.
Figure 5:
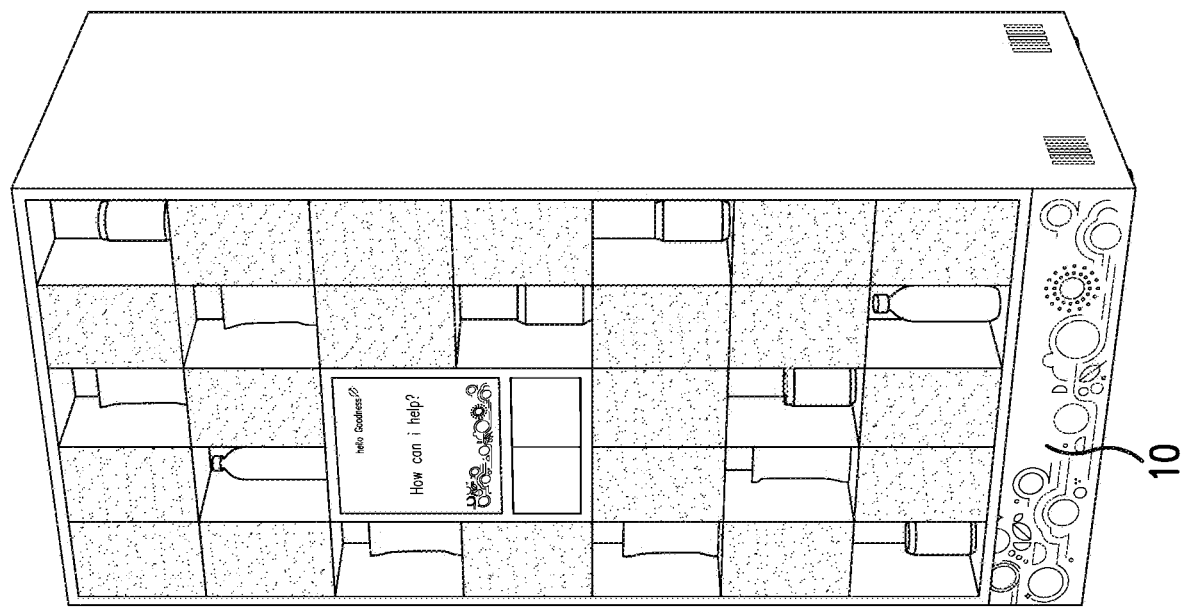
Figure 6:
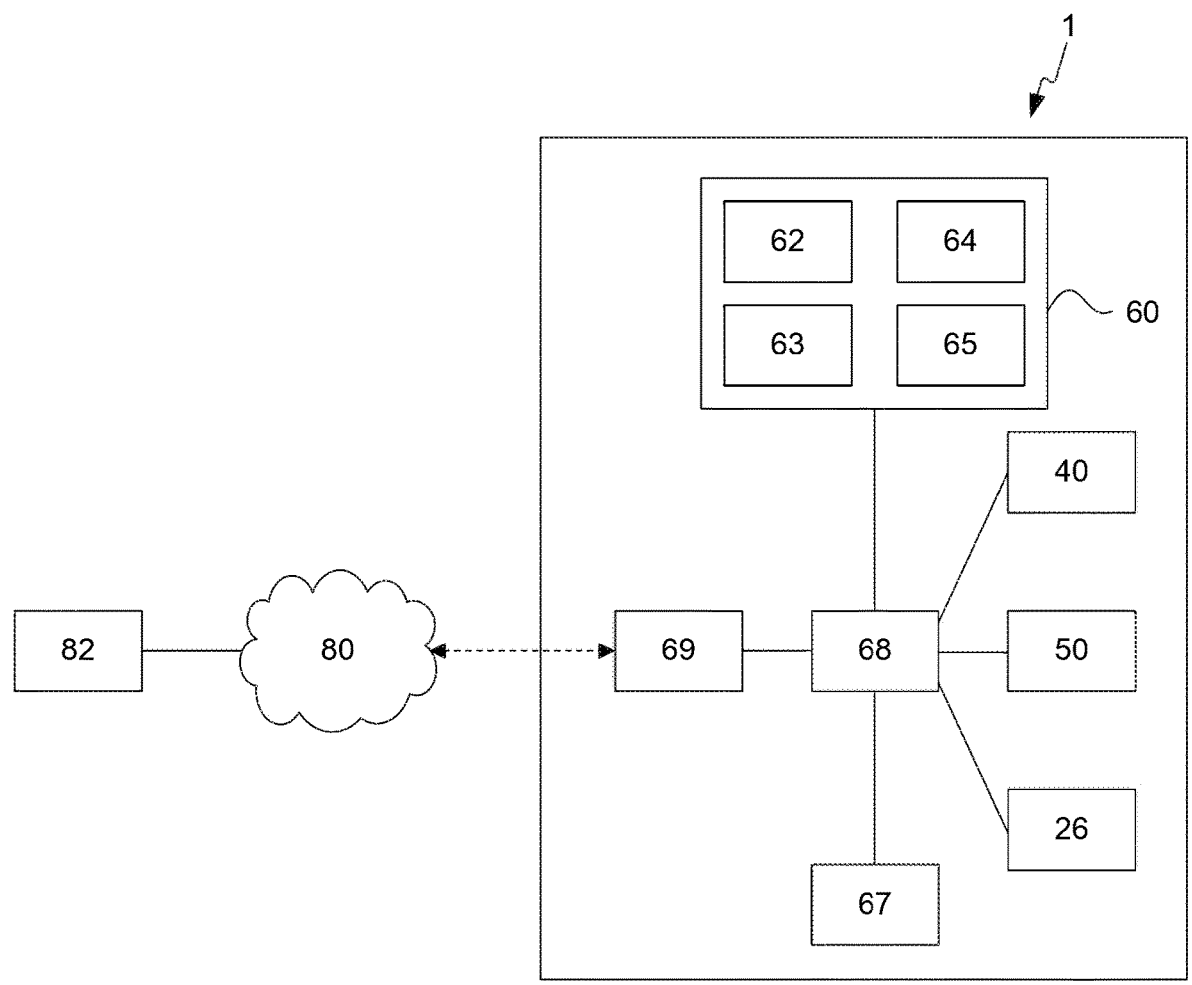
FIG. 6 is a system diagram of a vending machine according to embodiments.

In embodiments, front portion 10 may be a stand-alone module that may be retrofitted onto the front of a standard vending machine 90. Referencing FIG. 5, standard vending machine 90 becomes equivalent to rear portion 20 of vending machine 1 described above. Front portion 10 is adapted to align delivery portal 50 with the delivery portal of standard vending machine 90. Front portion 10 may be attached to standard vending machine 90 in several different ways, including screw attachments, friction fit brackets, or welding.

Embodiments of front portion 10 used for retrofitting standard vending machine 90 may include any or all of the features described above regarding front portion 10. In particular, user interface 60, including touchscreen 62, voice interface 64, and sensors 65 may be present. Display units 14 may also be present and may be filled with display products 16 that correspond to the existing vending products 94 that are found in standard vending machine 90. These retrofit embodiments of front portion 10 may also include controller 68 and computer memory 67, and the information stored therein as described above. The retrofit embodiments of front portion 10 may also be capable of interacting with customers in the same manner as described above, including, for example, making product recommendations and filtering product selections according to a selected product attribute 66. Some advantages of retrofitting embodiments of front portion 10 on standard vending machine 90 include enhancing the ability of standard vending machine 90 to display existing vending products 92 to potential customers as well as interacting with those potential customers.

Figure 7:
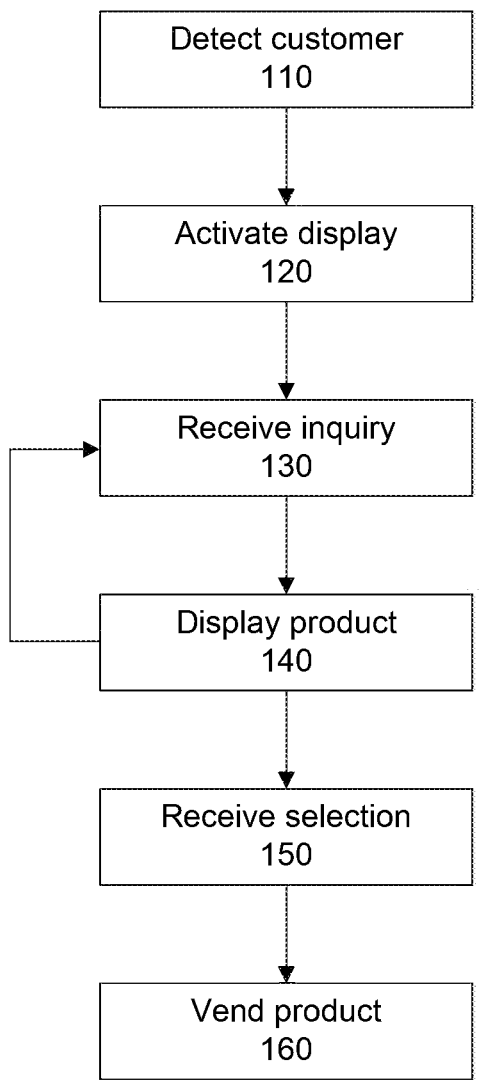
FIG. 7 is a flow chart of a method of using embodiments of a vending machine.

A method of using an embodiment of vending machine 1 described above is as follows. With reference to FIG. 7, the method begins with a detection step 110, wherein a potential customer is detected in proximity to vending machine 1. In response, in a display step 120, vending machine 1 activates sequence 70 to entice the customer to make a purchase. In a query step 130, the customer may ask for a recommendation or may make a selection of product attributes 66. In a reply step 140, vending machine 1 may display a recommended vending product 22 through a combination of illumination of product display units 14, display of images on touchscreen 62, and audible signals through voice interface 64. In the case where product attributes 66 are selected, one or more vending products 22 matching selected product attributes 66 may be displayed in the same manner. Steps 130 and 140 may be repeated in order to narrow the selection of vending products 22 that are shown. In a selection step 150, the customer selects a product for vending, and in a vending step 160 the selected product is dispensed through delivery portal 50.

Another method of using embodiments of vending machine 1 may begin with detecting a customer in proximity to vending machine 1 using sensors 65. Vending machine 1 may then transmit an inquiry to the customer in response. This inquiry may include displaying a message on touchscreen 62, selectively illuminating display units 14, or audibly reciting a message via voice interface 64.

In response to transmitting the inquiry, the customer may provide a first product preference to vending machine 1 using any of the functionality associated with user interface 60, including using touchscreen 62, speaking through voice interface 64, or gesturing picked up by sensors 65. Vending machine 1 will then illuminate one or more product display units 14 that contain display product 16 that matches the first product preference while not illuminating product display units 14 that do not contain display products 16 that match the first product preference. The customer can then select a desired display product 16, which vending machine 1 dispenses through horizontally-centered dispensing portal 50.

The breadth and scope of the present disclosure should not be limited by any of the above-described exemplary embodiments, but should be defined only in accordance with the following claims and their equivalents.

What is claimed is:

1. A method of dispensing a product from a vending machine, the method comprising:
   receiving a first input from the customer through a user interface disposed on a housing of the vending machine;
   determining a product recommendation based on the first input, wherein the product recommendation is different from the input;
   selectively modifying the transparency of a portion of a front wall of a display section disposed in a front portion of the vending machine through a transparency control element such that a display unit that contains a product corresponding to the product recommendation is visible through the front wall;
   receiving a product selection from the customer;
   dispensing the selected product using a product delivery system configured to deliver one of the selected product from a product storage section disposed in the vending machine to a dispensing portal that is disposed in the vending machine.

2. The method of claim 1, further comprising:
   receiving a second input after adjusting the transparency of the front wall; and
   updating the product recommendation based on the second input; and
   updating the transparency of the front wall to make the product display that corresponds to the updated product recommendation visible.

3. The method of claim 1, wherein the product storage section is disposed in a rear portion of the vending machine.

4. The method of claim 1, further comprising wherein the first input and the product selection may be received through any one or more of a touchscreen, a keypad, a voice command, a gesture, or a mobile application.

5. The method of claim 1, further comprising selectively illuminating a display light positioned to illuminate the display product in order to attract customers.

6. The method of claim 1, wherein the product recommendation is based on the input and external information, wherein the external information comprises one or more of outside weather conditions, time of day, date, and sales or promotion data.

7. The method of claim 1, further comprising:
   displaying a sequence of effects in response to detecting a customer, wherein the effects are configured to attract the customer.

8. A method of dispensing a product with a vending machine, the method comprising:
- receiving a first input from the customer through a user interface disposed on a housing of the vending machine;
- determining a product recommendation based on the first input, wherein the product recommendation is different from the input;
- selectively reducing the transparency of a portion of a front wall of a display section disposed in a front portion of the vending machine that correspond to display units that contain products that do not correspond to the product recommendation through a transparency control element;
- receiving a product selection from the customer;
- dispensing the selected product using a product delivery system configured to deliver one of the selected product from a product storage section disposed in the vending machine to a dispensing portal that is disposed on the vending machine.

9. The method of claim 8, wherein the product storage section is disposed in a rear portion of the vending machine.

10. The method of claim 8, further comprising wherein the first input and the product selection may be received through any one or more of a touchscreen, a keypad, a voice command, a gesture, or a mobile application.

11. The method of claim 8, further comprising selectively illuminating a display light positioned to illuminate the display product to attract customers.

12. The method of claim 8, wherein the product recommendation is based on the input and external information, wherein the external information comprises one or more of outside weather conditions, time of day, date, and sales or promotion data.

13. The method of claim 8, further comprising:
- displaying a sequence of effects in response to detecting a customer, wherein the effects are configured to attract the customer.

14. A method of dispensing a product with a vending machine, the method comprising:
- receiving a first input from a customer through a user interface;
- determining a product recommendation based on the first input, wherein the product recommendation is different from the input;
- selectively modifying the transparency of a portion of a front wall disposed in a front portion of the vending machine that correspond to display units to increase visibility of products corresponding to the product recommendation;
- receiving a product selection from the customer;
- dispensing the selected product using a product delivery system configured to deliver an example of the selected product from a product storage section disposed in the vending machine to a dispensing portal that is disposed on the vending machine.

15. The method of claim 14, wherein the selective modification of the transparency reduces the transparency of display units containing products that do not correspond to the product recommendation.

16. The method of claim 14, wherein the selective modification of the transparency increases the transparency of display units containing products that correspond to the produce recommendation.

17. The method of claim 14, wherein the product storage section is disposed in a rear portion of the vending machine.

18. The method of claim 14, further comprising wherein the first input and the product selection may be received through any one or more of a touchscreen, a keypad, a voice command, a gesture, or a mobile application.

19. The method of claim 14, further comprising selectively illuminating a display light positioned to illuminate the display product to attract customers.

20. The method of claim 14, wherein the product recommendation is based on the input and external information, wherein the external information comprises one or more of outside weather conditions, time of day, date, and sales or promotion data.

21. The method of claim 14, further comprising:
- displaying a sequence of effects in response to detecting a customer, wherein the effects are configured to attract the customer.

* * * * *